US009774949B2

(12) United States Patent
Ruan et al.

(10) Patent No.: US 9,774,949 B2
(45) Date of Patent: Sep. 26, 2017

(54) POWER CONTROL FOR MULTICHANNEL SIGNAL PROCESSING CIRCUIT

(71) Applicant: TEXAS INSTRUMENTS INCORPORATED, Dallas, TX (US)

(72) Inventors: Jin Ruan, Shanghai (CN); Shun Qian, Shanghai (CN); Shizhou Liu, Shanghai (CN); Dafydd H. Roche, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 467 days.

(21) Appl. No.: 14/193,201

(22) Filed: Feb. 28, 2014

(65) Prior Publication Data

US 2015/0249881 A1 Sep. 3, 2015

(51) Int. Cl.
*G06F 17/00* (2006.01)
*H04R 3/00* (2006.01)
*H04S 3/00* (2006.01)

(52) U.S. Cl.
CPC . *H04R 3/00* (2013.01); *H04S 3/00* (2013.01)

(58) Field of Classification Search
CPC ........ H04R 3/00
USPC ........ 700/94
See application file for complete search history.

(56) References Cited

U.S. PATENT DOCUMENTS 8,063,764 B1 11/2011 Mihailidis et al.
2013/0029684 A1* 1/2013 Kawaguchi ........ H04R 3/005 455/456.1
2014/0012573 A1* 1/2014 Hung ........ G06F 1/3215 704/233
2014/0278393 A1* 9/2014 Ivanov ........ G10L 15/20 704/233

FOREIGN PATENT DOCUMENTS

CN 101146004 A 3/2008
CN 101282335 A 10/2008
CN 101595650 A 12/2009
CN 101689073 A 3/2010

OTHER PUBLICATIONS

Publication, "Technical Note TN2321 Saving Power During Audio I/O—the kAudioHardwarePropertyPowreHint Property"; https://developer.apple.com/library/mac/technotes/tn2321/_index.html; printed Jul. 30, 2013, pp. 1-11.
First Office Action and Search Report, CN Patent Application No. 201510089206.0, dated May 26, 2017 (9 pages).

* cited by examiner

*Primary Examiner* — Joseph Saunders, Jr.

(74) *Attorney, Agent, or Firm* — Gregory J. Albin; Charles A. Brill; Frank D. Cimino

(57) ABSTRACT

A circuit includes an input channel array that includes a plurality of channels to receive a plurality of input signals and generate a plurality of channel output signals. A processor to processes the plurality of channel output signals from the input channel array. The processor and the input channel array are configured to operate in a sleep mode when all of the analog input signals are inactive or an active mode when at least one of the analog input signals is active. A secondary channel samples the plurality of input signals and generates a secondary output signal indicative of activity for at least one of the input signals. A secondary channel detector determines a level of signal activity for any of the input signals during the sleep mode based on the secondary output signal.

22 Claims, 4 Drawing Sheets

POWER CONTROL FOR MULTICHANNEL SIGNAL PROCESSING CIRCUIT

TECHNICAL FIELD

This disclosure relates to signal processing circuits, and more particularly to power control for a multichannel signal processing circuit.

BACKGROUND

Various media applications have become commonplace in both commercial and home settings. Such applications where large amounts of both analog and digital data are processed include home theater devices, audio/video receivers, and portable media players for example. To support these and other applications, high speed and real time processing is required to deliver the quality that users have become accustomed to. In many cases, digital signal processors are often employed to provide the underlying processing capability. The first step is usually to convert the signal from an analog to a digital form, by sampling and then digitizing it using an analog-to-digital converter (ADC). The application of computational power to digital signal processing allows for many advantages over analog processing in many applications, such as error detection and correction in transmission as well as data compression. As digital signal processors have become more complex to serve an ever increasing application requirement, processor power consumption has also increased to meet the increased processing demand.

SUMMARY

This disclosure relates to power control for a multichannel signal processing circuit.

In one example, a circuit includes an input channel array that includes a plurality of channels to receive a plurality of input signals and generate a plurality of channel output signals. A processor processes the plurality of channel output signals from the input channel array. The processor and the input channel array are configured to operate in a sleep mode when all of the analog input signals are inactive or an active mode when at least one of the analog input signals is active. A secondary channel samples the plurality of input signals and generates a secondary output signal indicative of activity for at least one of the plurality of input signals. A secondary channel detector determines a level of signal activity for any of the input signals during the sleep mode based on the secondary output signal. The secondary channel detector enables the processor and the input channel array to enter the active mode in response to the determined level of signal activity.

In another example, a circuit includes an input channel array having a plurality of channels to receive a plurality of input signals and to generate a plurality of channel output signals. A processor processes the plurality of channel output signals from the input channel array. A controller commands the processor and the input channel array into a sleep mode when all the input signals are inactive or an active mode when at least one of the input signals is active. A secondary channel samples the plurality of input signals for the plurality of channels and generates a secondary output signal indicative of activity for at least one of the plurality of input signals. A secondary channel detector determines a level of signal activity for any of the input signals during the sleep mode based on the secondary output signal. The secondary channel detector generates a wake event to the controller to command the processor and the input channel array to enter the active mode in response to the determined level of signal activity.

In yet another example, a circuit includes an input channel array having a plurality of channels to receive a plurality of input signals and to generate a plurality of channel output signals. A first processor core filters the plurality of channel output signals from the input channel array and provides a filtered output signal. A second processor core monitors the filtered output signal from the first processor core with respect to a predetermined threshold to determine when the plurality of input signals are inactive. A controller commands the first processor core, the second processor core, and the input channel array into a sleep mode when all the input signals are inactive or an active mode when at least one of the input signals is active. A secondary channel samples the plurality of input signals for the plurality of channels and generates a secondary output signal indicative of activity for at least one of the plurality of input signals. A secondary channel detector determines a level of signal activity for any of the input signals during the sleep mode based on the secondary output signal. The secondary channel detector generates a wake event to the controller to command the first processor core, the second processor core, and the input channel array to enter the active mode in response to the determined level of signal activity.

DETAILED DESCRIPTION

Figure 1:
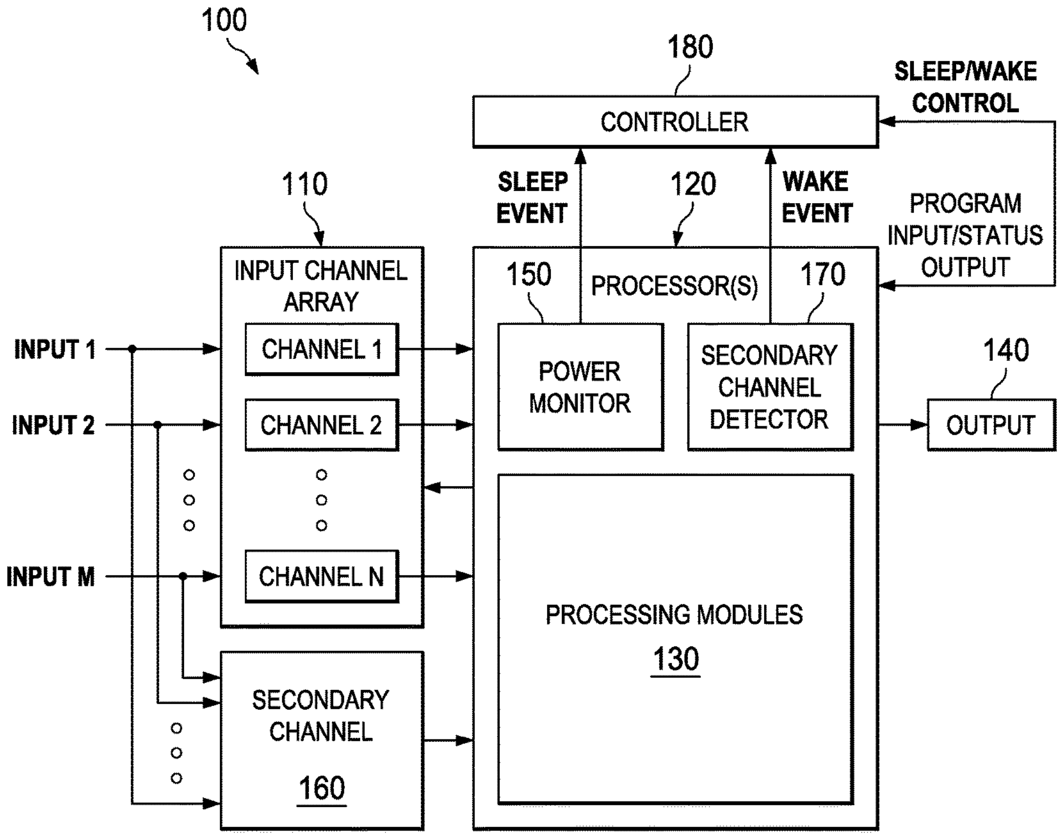
FIG. 1 illustrates an example of schematic block diagram of a multichannel signal processing circuit that employs sleep and wake events to facilitate power control.

This disclosure relates to power control for a multichannel signal processing circuit. The multichannel signal processing circuit includes various inputs for receiving analog data such as from analog audio streams. The inputs can be converted via an input channel array that includes analog to digital conversion, filtering, and programmable analog gain, for example. One or more other inputs can receive digital microphone inputs for example along with serial digital audio data streams. The inputs are processed via various processing modules in a processor (e.g., digital signal processor or processors) that can include digital filters, digital gain amplifiers, mixers, and volume controls, for example. In order to conserve power, the inputs are monitored by the processor and if all the inputs become inactive, (e.g., the inputs fall below predetermined threshold), the processor can set a sleep event flag to alert an external controller that the processor intends to enter a sleep mode where both the processor and the input channel array are entering into a low power state.

During sleep mode, which can be initiated by the external controller via register command or clock/ctrl signal to the processor, a low power secondary channel monitors each of the inputs for signal activity. A secondary channel detector can compare the output from the secondary channel with respect to programmable thresholds. If activity is detected on any of the inputs, the secondary channel detector can assert a wake event flag to notify the external controller to enable the processor and the input channel array to reenter the active state. By utilizing a very low power secondary channel and low power external controller to monitor for signal activity during sleep mode, system power can be substantially reduced since almost all processing and channel functionality can be substantially disabled during the sleep state of the system (e.g., power reduced by a factor of 100 over normal operating system power).

When the processor is in the active state, the secondary channel can be employed for auxiliary functionality that can include DC monitoring and/or individual channel power control. For instance, one or more of the analog inputs can be sampled for DC change detection (e.g., monitor a battery voltage or volume control for change in voltage level). Also, intermediate power savings are possible by selectively enabling or disabling one or more channels of the input channel array. If no signal activity is detected by monitoring output from the secondary channel with respect to a threshold, for example, the respective channel where no signal activity has been detected can be disabled by the processor. Each channel can be periodically sampled to determine activity and subsequently enabled when activity has been detected.

During sleep mode, the output of the processor can be disabled such that when reentering the active state after the wake event has occurred, signal processing operations can be restored before enabling data to the output (e.g., before digital volume control asserted). As such, if a speaker were connected to the output, a smooth transition between no sound and sound can occur without a corresponding pop/click noise. Similarly, before entering sleep mode, the processor can disable the output before entering sleep mode to mitigate unwanted speaker noise, for example.

FIG. 1 illustrates an example of a multichannel signal processing circuit 100 that employs sleep and wake events to facilitate power control. As used herein, the term circuit can include a collection of active and/or passive elements that perform a circuit function, such as an analog or digital converter. The term circuit can also include an integrated circuit where all the circuit elements are fabricated on a common substrate, for example. The circuit 100 includes an input channel array 110 having a plurality of channels shown as channels 1 through N, with N being a positive integer. The channels receive a plurality of input signals 1 though M, with M being a positive integer and generate a plurality of channel output signals. The channels in the input channel array 110 can include an analog function, a digital function, or a combination of analog and digital functions. As an example, a given channel of the channel array 110 can include a programmable gain amplifier (PGA), an analog to digital converter (ADC), and a filter to filter output from the ADC (e.g., cascaded integrator comb filter).

A processor 120 processes the plurality of channel output signals from the input channel array 110. In some examples, the processor 120 can be a digital signal processor (or processors). In other examples, the processor 120 can operate as an analog processor where all signals are processed in the analog domain. The processor 120 can also operate as a collection of processors where some functions are performed by one processor and some functions performed by one or more other processors, for example. The processor 120 can include one or more processing modules 130 (e.g., analog and/or digital) to process the output from the input channel array 110 and to generate an output 140. The output 140 can be analog, digital, or a combination thereof. This can include serial and/or parallel data output 140, for example (e.g., serial digital audio data output).

The processor 120 and the input channel array 110 operate in a sleep mode when all the analog input signals 1 though M are inactive or operate in an active mode when at least one of the analog input signals is active. A power monitor 150 is operative during the active state of the processor 120 to determine when all of the inputs 1 though M have become inactive. The power monitor 150 can compare data from each channel to a predetermined threshold (e.g., −60 dbFS (dB relative to the full scale input of the system)) to determine signal activity or inactivity. Thus, the power monitor 150 can detect whether to enter sleep mode by comparing each of the plurality of channel output signals from the input channel array 110 with a predetermined signal loss threshold for each respective channel output signal.

A secondary channel 160 samples the analog input signals 1 though M for the plurality of channels and generates a secondary output signal to indicate signal activity for each of the analog input signals. The secondary channel 160 primary function is to monitor the inputs 1-M during sleep mode for signal activity. Another function of the secondary channel 160 is to monitor for DC level changes for one or more of the inputs when the circuit is in active mode. A secondary channel detector 170 monitors the secondary output signal from the secondary channel 160 during the sleep mode of the processor 120 and the input channel array 110 and enables the processor and the input channel array to enter the active mode if the secondary output signal indicates signal activity for any of the analog input signals. As will be illustrated and described in more detail below with respect to FIG. 3, the secondary channel detector 170 can be configured include different functions operative in different modes, including a wake detector for signal activity detection during sleep mode and a DC level change detector for level change detection during active mode.

The circuit 100 can include a plurality of analog inputs for receiving analog data such as from analog audio streams, for example. The analog inputs can be converted via the input channel array 110 that can include analog to digital conversion, filtering, and programmable analog gain, for example. Other inputs (See e.g., FIG. 2) can include digital microphone inputs for example along with serial audio data streams. The digital inputs can be processed via various processing modules 130 in the processor 120. For example, the processing modules 130 can include digital filters, digital gain amplifiers, mixers, and volume controls, for example.

In order to help conserve power, the inputs 1-M are monitored by the processor 120 and power monitor 150 and if all the inputs become inactive, (e.g., inputs fall below predetermined signal loss threshold), the processor can set a sleep event flag to alert an external controller 180 that the processor intends to enter sleep mode where both the processor 120 and the input channel array 110 are entering into a low power state. During sleep mode which can be initiated by the external controller 180 via sleep/wake controls such as a via a register command program input to the processor 120, the secondary channel 160 monitors each of the inputs 1 though M for resumption of signal activity.

The secondary channel detector 170 compares the output from the secondary channel to programmable thresholds. If activity is detected on any of the inputs 1 though M, the secondary channel detector 170 asserts the wake event flag which notifies the external controller 180 to enable the processor 120 and the input channel array 110 to reenter the active state. By utilizing the very low power secondary channel 160 and external controller 180 to monitor for signal activity during sleep mode, system power can be substantially reduced relative to existing processing circuitry since almost all processing and channel functionality can be substantially disabled during the sleep state of the circuit 100.

As shown, the power monitor 150 generates the sleep event to the controller 180 based upon the determination of sleep mode. The controller 180 commands the processor 120 and the input channel array 110 into sleep mode in response to the sleep event. The controller 180 can generate a plurality sleep/wake control commands which can include providing program input to the processor 120 and receiving status output from the processor. The program input and status output can be exchanged via register banks, for example, as illustrated and described below with respect to FIG. 2. In one specific example, the power monitor 150 receives the program input from the processor 120 for setting an amount of time to monitor each of the input signals and for a value of a signal loss threshold for each respective channel output signal. In another example, the secondary channel detector 170 receives program input from the processor 120 to specify an amount of time to sample each of the input signals and a value for a signal resume threshold.

When the processor 120 is in the active state (e.g., at least one of the channels in the input channel array have a signal above threshold), the secondary channel 160 can be employed for auxiliary functionality that includes DC monitoring and/or individual channel power control. For instance, one or more of the analog inputs 1 though M can be sampled for DC change detection (e.g., monitor a battery voltage or volume control for change in voltage level). Also, intermediate power savings are possible by selectively enabling or disabling one or more channels 1 though N of the input channel array 110. For instance, if no signal activity is detected by monitoring output from the secondary channel 160 with respect to a threshold via the secondary channel detector 170, for example, the respective channel where no signal activity has been detected can be disabled by the processor 120.

Each channel 1 though N can be sampled to determine activity and subsequently enabled when activity has been detected by the secondary channel detector 170. As will be described in more detail below with respect to FIGS. 2 and 3, various programmable settings are possible that can be initiated by the controller 180 via the program input. For example, register banks associated with the processor 120 can be programmed via the controller 180 to select threshold settings (e.g., signal loss and resume conditions) for the secondary channel detector, scan times for scanning a given input, filter settings within the processor, and interrupt behavior related to the sleep and wake event flags. During sleep mode, the output of the processor 120 can be disabled such that when reentering the active state in response to the wake event, signal processing operations can be restored before enabling data to the output 140 (e.g., via output digital volume control). For example, if a speaker were connected to the output 140, a smooth transition between no sound and sound can occur without a corresponding pop/click noise. Similarly, before entering sleep mode, the processor can disable the output 140 before entering sleep mode to mitigate unwanted speaker noise, for example.

Figure 2:
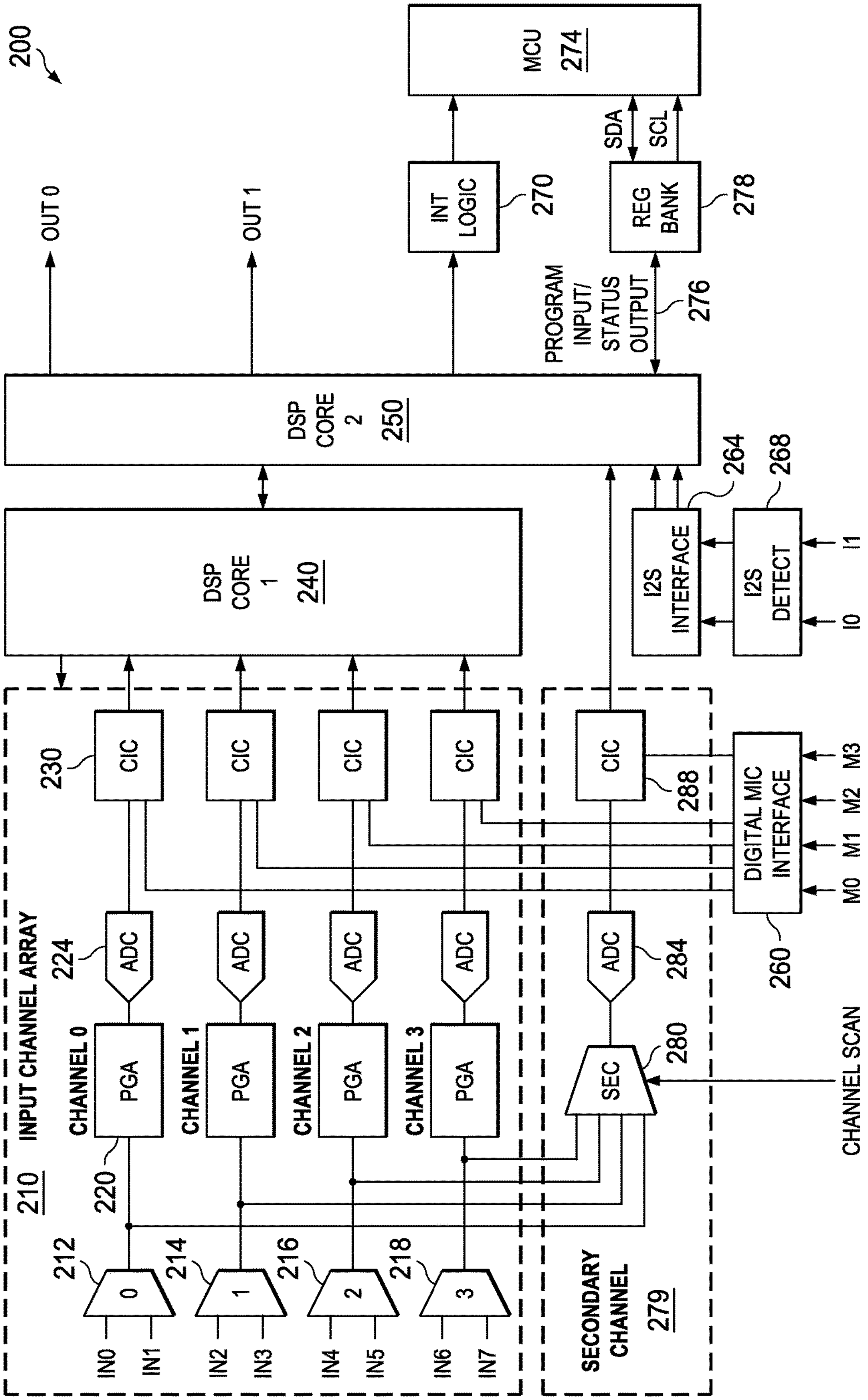
FIG. 2 illustrates an example of a multichannel signal processing circuit that employs multiple processors and a secondary channel to facilitate power control.

FIG. 2 illustrates an example of a multichannel signal processing circuit 200 that employs multiple processors and a secondary channel to facilitate power control. The circuit 200 includes an input channel array 210 to process media data such as a plurality of audio input streams. In this example, eight analog audio inputs are provided and shown as IN0 through IN7. As noted above, more or less such inputs can be provided. Each of the inputs IN0-IN7 can be multiplexed via MUX 212 for channel 0 of the input channel array 210, MUX 214 for channel 1, MUX 216 for channel 2, and MUX 218 for channel 3. For purposes of brevity, a single channel of the channel array will be described but the other channels can be similarly configured. With respect to channel 0 of the input channel array 210, output from MUX 312 can feed a programmable gain amplifier (PGA) 220 which in turn drives an analog to digital converter (ADC) 224. Output from the ADC 224 can be fed to a cascaded integrator comb (CIC) filter 230, for example, which can feed a first digital signal processor (DSP) core 240.

The first DSP core 240 can include digital gain amplifiers and digital filters, for example, to further process the channel data received from the input channel array 210. Output from first DSP core feeds a second DSP core 250. The second DSP core 250 can include other filters, digital volume controls, a digital mixer, a power monitor and a secondary channel detector, such as disclosed herein with respect to FIG. 3. In addition to the inputs IN1-IN7, digital microphone inputs M0 though M3 can also be received via digital microphone interface 260 and processed similarly.

For example, output from the microphone interface 260 can be applied to the CIC's in the input channel array 210. Also, a digital audio interface 264 (e.g., I2S, time division multiplexed data, S/PDIF) can be provided that receives serial audio inputs I0 and I1 from detector 268. The second DSP core 250 can monitor each of the inputs IN1-IN7, M0-M3, and I0-I1 to determine whether or not to enter sleep mode. Two example outputs OUT 0 and OUT 1 from the second DSP core 250 can provide serial digital audio streams respectively that can be employed by downstream circuit to generate sound, for example.

If the second DSP core 250 determines that no signal activity has occurred on any of the respective inputs, it can issue a sleep interrupt command via interrupt logic 270 to an external micro controller (MCU) 274. When receiving the command, the MCU 274 can command the majority of the second DSP core 250, the first DSP core 240, and the input channel array 210 to enter sleep mode which represents a low power state for the circuit 200. In one example, program input commands and status output can be exchanged via bus 276 as register commands via register bank 278. Upon receiving a command, the second DSP core 250 can in turn command the first DSP core 240 and the input channel array 210 to shut down. After entering sleep mode, a secondary channel 279 remains active and continues to monitor the inputs IN1-IN7 via a secondary MUX 280.

Output from the MUX 280 drives a secondary ADC 284 and CIC filter 288 which also receives combined output from the digital microphone interface 260. A secondary channel detector (not shown) in the second DSP core 250 can be configured to monitor for any activity on the secondary channel and/or I2S interface 264 to determine whether or not signal activity has occurred by comparing the output of the secondary channel detector to a predetermined threshold. If a signal has been detected, an interrupt is generated to the MCU 274, which can in response activate those portions of the circuit 200 via register bank 278 command that require signal processing for the detected active signal. As an alternative to register bank control, the MCU 274 can assert/de-assert clock and enable signals (not shown) to the DSP core 250 which can be utilized to initiate sleep and active modes within the circuit 200.

As mentioned above, when the circuit 200 is in the active state (e.g., at least one of the channels in the input channel array have a signal above threshold), the secondary channel can be employed for auxiliary functionality that includes DC monitoring and/or individual channel power control. For instance, one or more of the inputs IN0-IN7 can be scanned via the secondary channel 279 for DC change detection (e.g., monitor a battery voltage or potentiometer control for change in voltage level that will control system audio volume). Additionally, intermediate power savings are possible by selectively enabling or disabling one or more channels 1 though 3 in this example of the input channel array 210. For instance, if no signal activity is detected by monitoring output from the secondary channel with respect to a threshold, for example, the respective channel where no signal activity has been detected can be disabled by the MCU 274 by issuing a command to register bank 278. As shown, a channel select input can be provided on the secondary MUX 280 to enable the MCU to sample each input and determine whether or not signal activity has occurred for a given channel.

Each channel 0 though 3 can be periodically sampled to determine activity and subsequently enabled when activity has been detected by the secondary channel via MUX 280. Various programmable settings are possible that can be initiated by the MCU via register bank 278. For example, the register bank 278 can be programmed via the MCU 274 to select threshold settings (e.g., signal loss and resume conditions) for the secondary channel 279, scan times for scanning a given input, filter settings within the processor, and interrupt behavior related to the sleep and wake event flags.

Figure 3:
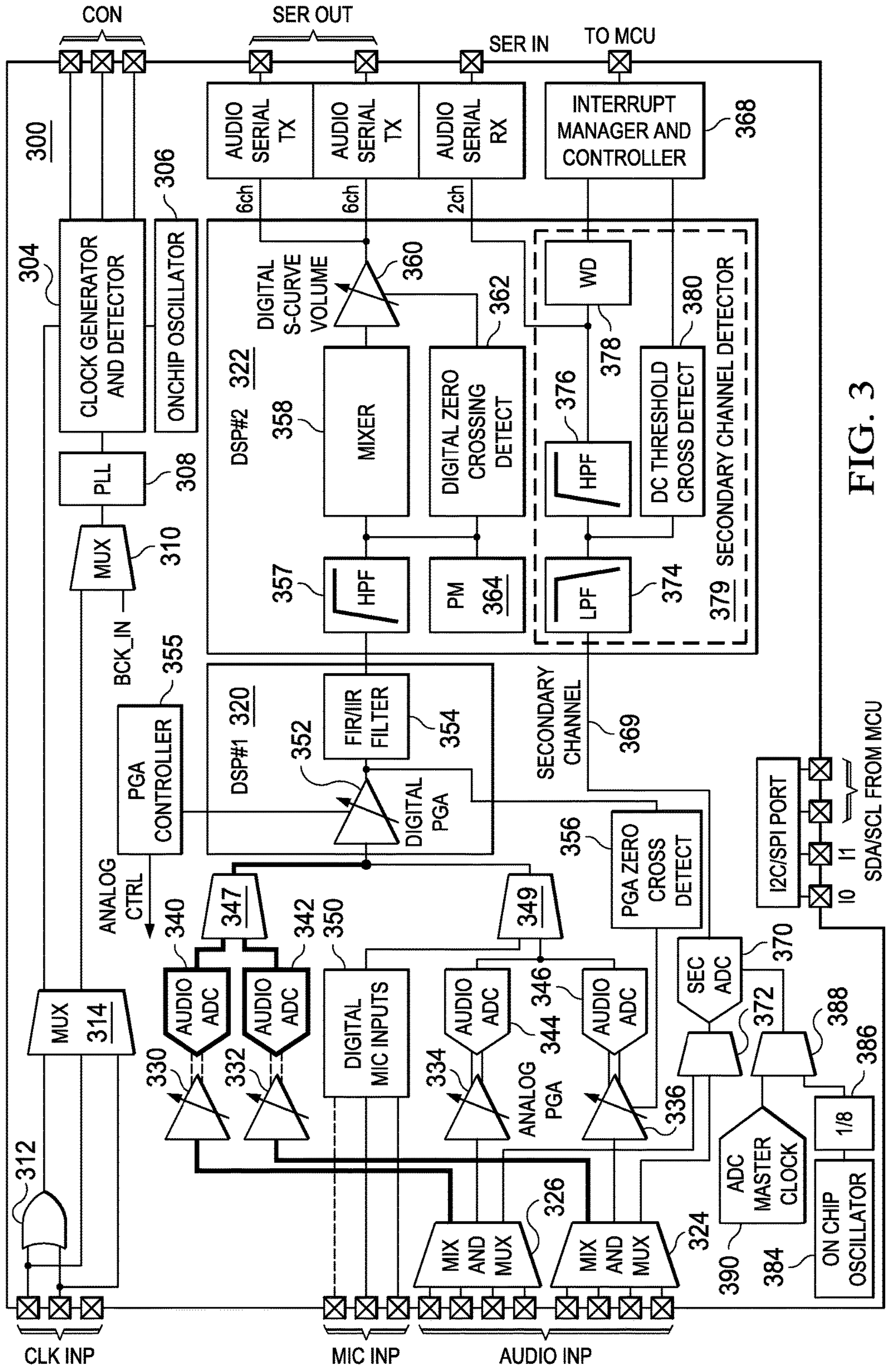
FIG. 3 illustrates an alternative example of a multichannel signal processing circuit that employs multiple processors and a secondary channel to facilitate power control.

FIG. 3 illustrates an alternative example of a multichannel signal processing circuit 300 that employs multiple processors and a secondary channel to facilitate power control. The circuit 300 includes a clock generator 304 to generate circuit clocks. The clock generator 304 can be driven from a number of sources including an on chip oscillator 306, a phase locked loop (PLL) 308, and from an external clock input (CLK INP). The PLL 308 can be operated via MUX 310 to operate from a serial clock input or driven from the CLK INP. As shown, the CLK INP inputs can drive a logic gate 312 which also feeds MUX 314. Output from MUX 314 can in turn drive MUX 310 and the clock generator 304. External control inputs (CON) can be employed (e.g., by an external controller) to enable/disable the clock generator in active/sleep modes. The clock generator 304 supplies system clocks for analog to digital conversion and operation of a first DSP core 320 and a second DSP core 322.

Audio inputs (AUDIO INP) are received via MUX's 324 and 324. Output from the MUX's 324 and 326 feeds programmable gain amplifiers (PGA) 330, 332, 334, and 336. Output from PGA 330-336 is converted by ADC 340 through 346, respectively. Output from the ADC 340-346 can be MUXed via MUX's 347 and 349 whose outputs can be supplied to the first DSP core 320. Data from digital microphone inputs 350 can also be supplied to DSP core 320 via MUX 349. In one example, the first DSP core 320 can include a digital PGA 352 which supplies a digital filter 354. The digital filter 354 can include a finite response filter and/or an infinite response filter, for example. Other circuit front end functionality can include a PGA controller 355 to control the gain of the respective PGA's 330-336 and 352. A PGA zero cross detector 356 may be provided to control noise levels within the circuit. Output from the first DSP core 320 is provided to the second DSP core 322 via high pass filter (HPF) 357. Output from the HPF 357 drives a multichannel digital mixer 358 which feeds a digital volume control 360. The volume control 360 drives a pair of serial digital output channels (SER OUT). A serial digital input channel (SER IN) can also be received by the DSP core 322. A zero cross detector 362 can be employed to increase and/or decrease the volume control 360 depending on whether or not signal has been detected.

A power monitor (PM) 364 detects when all signals have become inactive. When this occurs, the DSP core 322 can initiate an interrupt via interrupt controller 368 that the system is going into low power sleep mode. An external controller (not shown) can receive the interrupt and command the respective analog channels, and DSP cores via serial data and serial clock inputs (SDA/SCL) to enter into sleep mode, for example.

After the circuit 300 has been put into sleep mode, a secondary channel 369 that includes a secondary ADC 370 and MUX 372 can be employed to monitor for input signal activity, such as disclosed herein. For example, output from the secondary ADC 370 is passed through a low pass filter (LPF) 374 and HPF 376 where it is monitored via a wake detector (WD) 378 that is part of a secondary channel detector 379. Output from the WD 378 drives the interrupt controller 368. When signal activity is detected via the WD 378, the interrupt controller 368 can generate an interrupt to cause the external controller to wake the circuit 300 back into an active state. For example, in response to the interrupt, the DSP core 320 can be reactivated. The PGA and corresponding ADC for the detected active channel can also be reactivated. Functions in DSP core 322, such as the mixer 358 and volume control 360, can similarly be reactivated upon transitioning from the sleep state to the wakened state.

During the active state of the circuit 300, the secondary ADC 370 and MUX 372 can be employed for monitoring DC voltage changes. For instance, one or more of the audio inputs may be connected to a DC source such as a battery or volume control. During the active mode, a DC threshold circuit 380 in the secondary channel detector 379 can be utilized to detect voltage changes sensed by the secondary ADC 370 via MUX 372. Other circuit components include a port 382 having an I2S I0 and I1 input for serial audio input. The port 382 also includes inputs to receive serial data commands (SDA) and a serial clock (SCL). The secondary ADC 370 can operate off two different clock sources. When in sleep mode, the secondary ADC 370 operates via an on-chip oscillator 384 and divider 386 (e.g., $1/8^{th}$) via MUX 388. When in active mode, the secondary ADC 370 operates via an ADC master clock 390 via MUX 388.

As noted previously, various functions and thresholds described herein can be programmed (e.g., via register bank command from MCU). Examples of programmable functions and thresholds can include:

- Coefficients for the Low Pass Filter 374
- Coefficients for the High Pass Filter 357 and 376
- Reference Voltage and Interrupt Voltage Delta for each input in active mode
- Signal Loss Conditions for power monitor 364 (Time & Threshold)
- Signal Resume Conditions for secondary channel detector (Time & Threshold)

Interrupt behavior (e.g., ping every X mS if MCU host does not clear)

Scan time for each single ended input monitored by secondary channel

Figure 4:
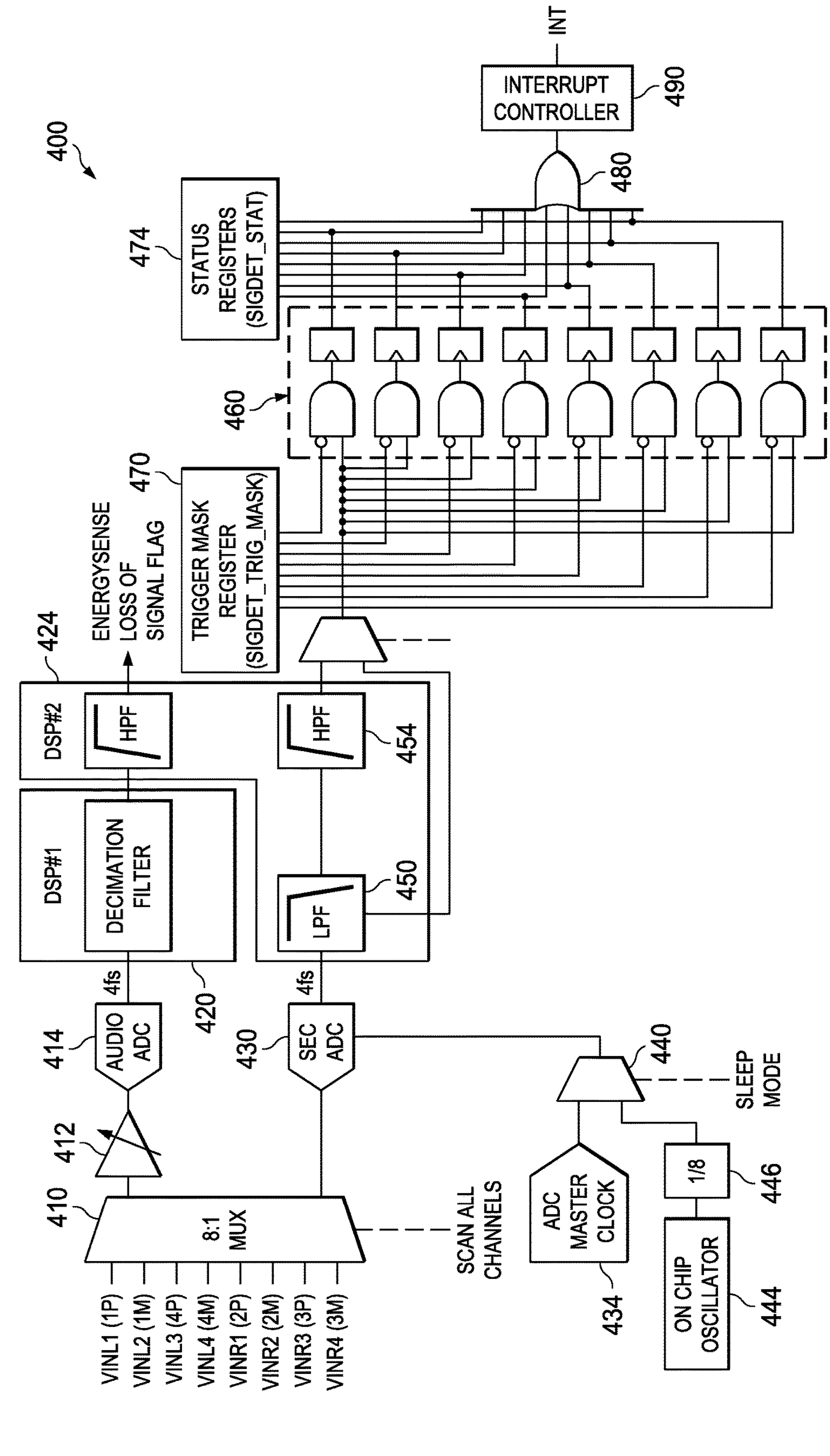
FIG. 4 illustrates an example of a secondary channel detector for a multichannel signal processing circuit.

FIG. 4 illustrates an example of a secondary channel detector circuit 400 for a multichannel signal processing circuit (e.g., processing circuits of FIG. 1, 2 or 3). The example circuit 400 shows an 8 channel detector however more or less than eight can be employed depending on the configuration of the respective application. Inputs 0-7 are passed though MUX 410 to primary channel PGA 412 and ADC 414. Output from ADC 414 is passed to a first DSP core 420 acting as a decimation filter. Output from the first DSP core 420 is passed to a second DSP core 424 which performs a high pass filter function for the primary channel. This output can be compared to one or more predetermined thresholds to determine if signal activity has been lost (e.g., all primary channel signals below predetermined signal loss threshold). The signal activity threshold can be user programmable, for example, by setting a register entry.

A secondary ADC 430 provides activity monitoring during sleep mode and DC level detect monitoring during active mode. As shown, during active mode, the secondary ADC 430 can operate off a system ADC clock 434 via MUX 440. During sleep mode, an on-chip oscillator 444 and divider 446 supplies the secondary ADC clock via MUX 440. Output from the secondary ADC 430 is fed to a low pass filter (LPF) 450 and high pass filter (HPF) 454 in the second DSP core 424. Output from the LPF 450 is utilized during active mode for DC level detect monitoring and output from the HPF 454 is employed for monitoring during sleep mode. A gate and latch circuit 460 captures which input as provided by MUX 464 had a change in level (during active mode) or signal detect during sleep mode. A mask register 470 can be provided to selectively enable or disable monitoring for one or more selected channels. A status register 474 can be employed to determine which signal has become active or changed. Output from the gate and latch circuit 460 is gated via gate 480 which drives an interrupt controller 490 to generate an interrupt output (e.g., to been read by external host controller sleep/active mode control).

Figure 5:
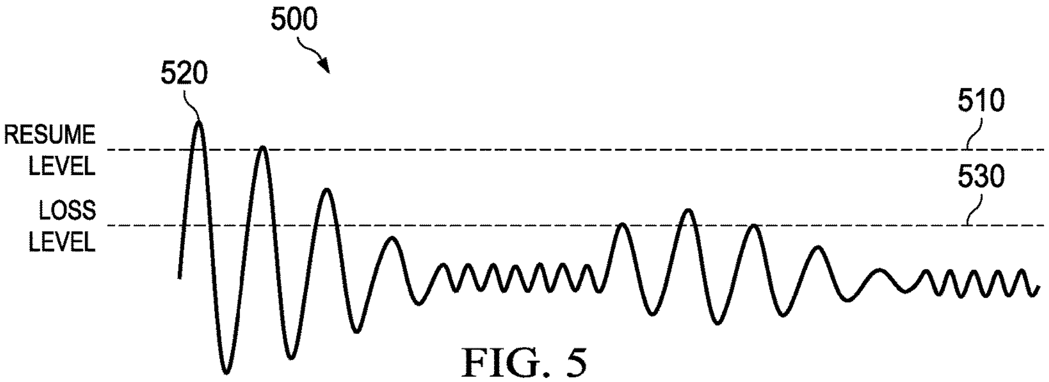
FIG. 5 illustrates an example signal diagram that depicts threshold levels for detecting sleep and active states in multichannel signal processing circuit having power control.

FIG. 5 illustrates an example signal diagram 500 that depicts threshold levels for detecting sleep and active states in multichannel signal processing circuit having power control. At 510, a resume threshold level is depicted. The resume threshold level represents a level where a given signal 520 must exceed in order to be considered active. Thus, when the secondary channel and secondary channel detector determines that any of the input signals has exceeded the resume threshold, a wake event can be generated and the input channel array and respective processor cores can be reactivated. At 530, a loss threshold is illustrated. The loss threshold represents a level where a signal level is less than in order to be considered inactive. Thus, when all the signals monitored by the processor (e.g., power monitor in processor) fall below the respective loss level, the system can be commanded into the sleep mode (e.g., via an external controller). Having a separate Resume and Loss threshold level enables the system to be more immune to noise sources in the user/system environment. For example, when the system's average power over time falls below the LOSS threshold, a shorter burst of noise (e.g., noise caused by interference by an RF source (such as cell phone GSM noise)) may be unlikely to wake the system, as a significant source greater than LOSS can be required to RESUME the system.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:

an input channel array including first and second inputs, first and second outputs, a first channel coupled between the first input and the first output, a second channel coupled between the second input and the second output, and a sleep mode control input;

a processor including a first input coupled to the first output of the input channel array, a second input coupled to the second output of the input channel array, and a sleep event output;

a secondary channel including a first input coupled to the first input of the input channel array, a second input coupled to the second input of the input channel array, and an output; and a secondary channel detector including an input coupled to the output of the secondary channel, and a wake event output, wherein the first and second input channels of the input channel array are configured to receive first and second input signals, respectively, and to generate first and second channel output signals, respectively, wherein the processor is configured to process the first and second channel output signals from the input channel array, wherein the processor and the input channel array are configured to operate in a sleep mode when the first and second input signals are inactive or an active mode when at least one of the first and second input signals is active, wherein the secondary channel is configured to sample the first and second input signals when the input channel array is operating in the sleep mode, and to generate a secondary output signal indicative of activity for at least one of the first and second input signals, and wherein the secondary channel detector is configured to determine a level of signal activity for any of the first and second input signals during the sleep mode based on the secondary output signal, and the secondary channel detector is configured to enable the processor and the input channel array to enter the active mode in response to the determined level of signal activity.

2. The circuit of claim 1, wherein the input channel array is configured to receive a plurality of input signals that includes the first and second input signals, the circuit further comprising a controller to command the processor and the input channel array into the sleep mode if all of the plurality of input signals are determined inactive and into the active mode if at least one of the plurality of input signals is determined active.

3. The circuit of claim 2, wherein the input channel array is configured to generate a plurality of channel output signals that includes the first and second channel output signals, the circuit further comprising a power monitor in the processor to detect whether to enter the sleep mode by comparing each of the plurality of channel output signals with a predetermined signal loss threshold for each respective channel output signal, wherein the power monitor generates a sleep event to the controller based upon the determination of the sleep mode and the controller commands the processor and the input channel array into the sleep mode in response to the sleep event.

4. The circuit of claim 3, wherein the power monitor receives a program input for setting an amount of time to monitor each of the input signals and a value of the predetermined signal loss threshold for each respective channel output signal.

5. The circuit of claim 2, wherein the secondary channel detector is configured to detect whether to enter the active mode by comparing the secondary output signal indicative of activity for at least one of the plurality of input signals with a respective signal resume threshold associated with each of the plurality of input signals, wherein the secondary channel detector generates a wake event based on the determination of the active mode and the controller commands the processor and the input channel array into the active mode in response to the wake event.

6. The circuit of claim 5, wherein the secondary channel detector receives a program input to specify an amount of time to sample each of the input signals and a value for the signal resume threshold.

7. The circuit of claim 1, wherein each of the first and second channels of the input channel array includes an amplifier to amplify a respective one of the first and second input signals and to generate an amplified signal, an analog to digital converter (ADC) to convert the amplified signal to a digital signal, and a filter to filter the digital signal to provide a respective one of the first and second channel output signals to the processor.

8. The circuit of claim 7, further comprising a parallel digital microphone input and a serial digital audio input to provide a microphone subset of digital signals and a serial subset of digital signals for the processor, wherein the microphone subset of digital signals is received via the filter and the serial subset of digital signals is received via a serial path in the processor.

9. The circuit of claim 1, wherein the secondary channel detector further comprises a DC level detector in the processor that receives output from the secondary channel when the processor is in the active mode, wherein the DC level detector generates an interrupt if a DC level change has been detected for a selected one of the first and second input signals during the active mode.

10. A circuit comprising:

an input channel array including first and second inputs, first and second outputs, a first channel coupled between the first input and the first output, a second channel coupled between the second input and the second output, and a sleep mode control input;

a processor including a first input coupled to the first output of the input channel array, a second input coupled to the second output of the input channel array, a sleep mode control input, and a sleep event output;

a secondary channel including a first input coupled to the first input of the input channel array, a second input coupled to the second input of the input channel array, and an output;

a secondary channel detector including an input coupled to the output of the secondary channel, and a wake event output; and a controller having a first input coupled to the sleep event output of the processor, a second input coupled to the wake event output of the secondary channel detector, and one or more outputs coupled to the sleep mode control inputs of the input channel array and the processor.

11. The circuit of claim 10, wherein the input channel array includes a plurality of channels that includes the first and second channels, wherein the plurality of channels of the input channel array are configured to receive a plurality of input signals and to generate a plurality of channel output signals, the plurality of input signals including first and second input signals, the plurality of channel output signals including first and second channel output signals, wherein the processor is configured to process the plurality of channel output signals from the input channel array, wherein the controller is configured to command the processor and the input channel array into a sleep mode when all the input signals are inactive or an active mode when at least one of the input signals is active, wherein the secondary channel is configured to sample the plurality of input signals for the plurality of channels and to generate a secondary output signal indicative of activity for at least one of the plurality of input signals, wherein the secondary channel detector is configured to determine a level of signal activity for any of the input signals during the sleep mode based on the secondary output signal, and wherein the secondary channel detector is configured to generate a wake event to the controller to command the processor and the input channel array to enter the active mode in response to the determined level of signal activity.

12. The circuit of claim 11, further comprising a power monitor in the processor to detect whether to enter the sleep mode by comparing each of the plurality of channel output signals with a predetermined signal loss threshold for each respective channel output signal, wherein the power monitor generates a sleep event to the controller based upon the determination of the sleep mode and the controller commands the processor and the input channel array into the sleep mode in response to the sleep event.

13. The circuit of claim 12, wherein the power monitor receives a program input for setting an amount of time to monitor each of the input signals and a value of the predetermined signal loss threshold for each respective channel output signal.

14. The circuit of claim 11, wherein the secondary channel detector is configured to detect whether to enter the active mode by comparing the secondary output signal indicative of activity for at least one of the plurality of input signals with a respective signal resume threshold associated with each of the plurality of input signals, wherein the secondary channel detector generates the wake event based on the determination of the active mode and the controller commands the processor and the input channel array into the active mode in response to the wake event.

15. The circuit of claim 14, wherein the secondary channel detector receives a program input to specify an amount of time to sample each of the input signals and a value for the signal resume threshold.

16. The circuit of claim 11, wherein the input channel array further comprises an amplifier to amplify a subset of the input signals and to generate a subset of amplified signals, an analog to digital converter (ADC) to convert the subset of amplified signals to a subset of digital signals, and a filter to filter the subset of digital signals to provide the plurality of channel output signals to the processor.

17. The circuit of claim 16, further comprising a parallel digital microphone input and a serial digital audio input to provide a microphone subset of digital signals and a serial subset of digital signals for the processor, wherein the microphone subset of digital signals is received via the filter and the serial subset of digital signals is received via a serial path in the processor.

18. The circuit of claim 11, wherein the secondary channel detector further comprises a DC level detector in the processor that receives output from the secondary channel when the processor is in the active mode, wherein the DC level detector generates an interrupt if a DC level change has been detected for a selected input signal during the active mode.

19. A circuit comprising:

an input channel array having a plurality of channels to receive a plurality of input signals and to generate a plurality of channel output signals;

a first processor core to filter the plurality of channel output signals from the input channel array and to provide a filtered output signal;

a second processor core to monitor the filtered output signal from the first processor core with respect to a predetermined threshold to determine when the plurality of input signals are inactive;

a controller to command the first processor core, the second processor core, and the input channel array into a sleep mode when all the input signals are inactive or an active mode when at least one of the input signals is active;

a secondary channel to sample the plurality of input signals for the plurality of channels and to generate a secondary output signal indicative of activity for at least one of the plurality of input signals; and a secondary channel detector configured to determine a level of signal activity for any of the input signals during the sleep mode based on the secondary output signal, the secondary channel detector generates a wake event to the controller to command the first processor core, the second processor core, and the input channel array to enter the active mode in response to the determined level of signal activity.

20. The circuit of claim 19, wherein the input channel array further comprises an amplifier to amplify a subset of the input signals and to generate a subset of amplified signals, an analog to digital converter (ADC) to convert the subset of amplified signals to a subset of digital signals, and a filter to filter the subset of digital signals to provide the plurality of channel output signals to the second processor core.

21. The circuit of claim 19, wherein the secondary channel detector further comprises a DC level detector in the second processor core that receives output from the secondary channel when the second processor core is in the active mode, wherein the DC level detector generates an interrupt if a DC level change has been detected for a selected input signal during the active mode.

22. A circuit comprising:

an input channel array including first and second inputs, first and second outputs, a first channel coupled between the first input and the first output, a second channel coupled between the second input and the second output, and a sleep mode control input;

a processor including a first input coupled to the first output of the input channel array, a second input coupled to the second output of the input channel array, and a sleep event output;

a secondary channel including a first input coupled to the first input of the input channel array, a second input coupled to the second input of the input channel array, and an output;

a secondary channel detector including an input coupled to the output of the secondary channel, and a wake event output; and a controller having a first input coupled to the sleep event output of the processor, a second input coupled to the wake event output of the secondary channel detector, and an output coupled to the sleep mode control input of the input channel array.

* * * * *